United States Patent [19]

Armstrong et al.

[11] Patent Number: 5,856,776
[45] Date of Patent: Jan. 5, 1999

[54] METHOD AND APPARATUS FOR SIGNAL COUPLING AT MEDIUM VOLTAGE IN A POWER LINE CARRIER COMMUNICATIONS SYSTEM

[75] Inventors: Donald Stuart Armstrong, Derbyshire; Nigal John Halse, York; Paul Martin Moore, Derby; Joseph Anthony Wells, Middlesex, all of United Kingdom

[73] Assignee: Remote Metering Systems, Ltd., Hants, United Kingdom

[21] Appl. No.: 649,623

[22] PCT Filed: Nov. 24, 1994

[86] PCT No.: PCT/GB94/02589

§ 371 Date: Sep. 26, 1996

§ 102(e) Date: Sep. 26, 1996

[87] PCT Pub. No.: WO95/15036

PCT Pub. Date: Jun. 1, 1995

[30] Foreign Application Priority Data

Nov. 24, 1993 [GB] United Kingdom .................. 9324152

[51] Int. Cl.[6] .................................................. H04M 11/04
[52] U.S. Cl. ............................... 340/310.01; 340/310.06; 340/310.07; 340/310.08
[58] Field of Search ........................ 340/310.01, 310.06, 340/310.07, 310.08

[56] References Cited

U.S. PATENT DOCUMENTS 3,223,889  12/1965  Schweitze, Jr. ................... 340/310.01
3,911,415  10/1975  Whyte ................................ 340/310.01
4,321,581   3/1982  Tappeiner et al. ................. 340/310.01
4,475,209  10/1984  Udren ................................ 340/310.01
4,686,382   8/1987  Shuey ................................ 340/310.01
4,745,391   5/1988  Gajjar ................................ 340/310.01

FOREIGN PATENT DOCUMENTS 620 058  6/1989  Australia .

OTHER PUBLICATIONS

C.Nunn et al, Remote Meter Reading And Control Using High–Performance PLC Communications Over The Low Voltage And Medium Voltage Distribution Networks, Proceedings of Seventh International Conference on Metering Apparatus and Tariffs for Electricity Supply, Nov. 1992, pp. 304–308.

*Primary Examiner*—Nina Tong
*Attorney, Agent, or Firm*—Lowe Hauptman Gopstein Gilman & Berner

[57] ABSTRACT

An electricity supply network has plural switching and transformer stations connected together by cables. Each cable has an inner conductor and an outer sheath connected to housings of the stations. A communication system has plural transducers coupled to the cables at the stations. Each of the transducers is located on a side of its respective cable remote from a sheath connection of the respective cable to its station housing. Each transducer is coupled to both the sheath and the conductor of its respective cable.

12 Claims, 3 Drawing Sheets

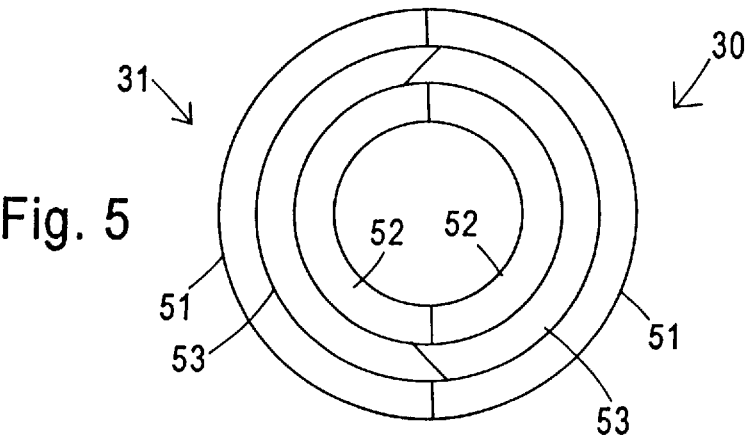
Fig. 5
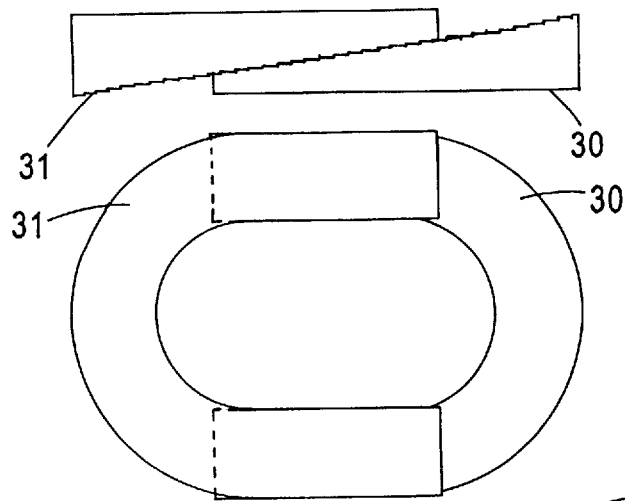
Fig. 6A
Fig. 6B
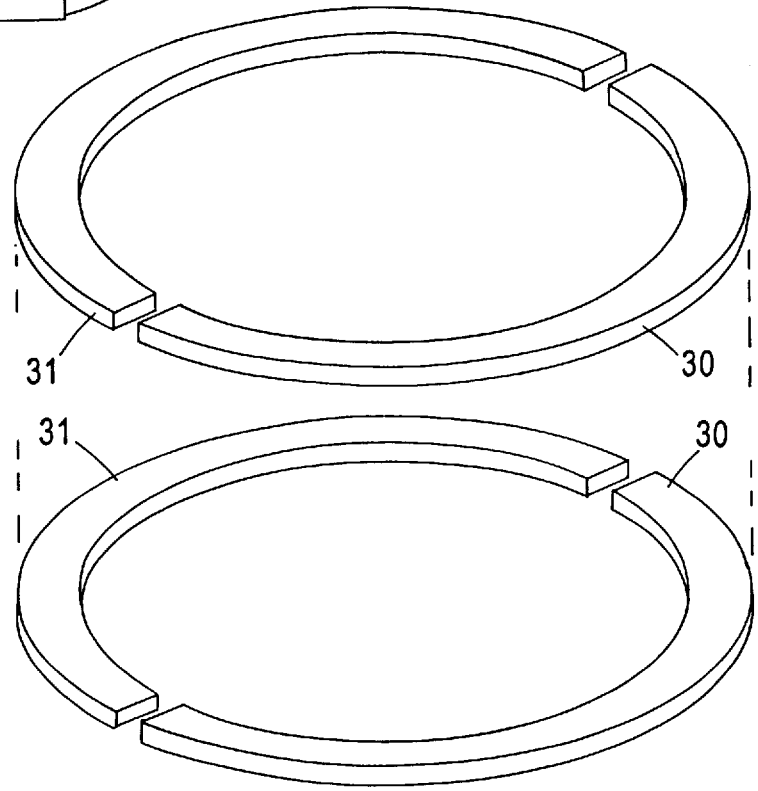
Fig. 7

METHOD AND APPARATUS FOR SIGNAL COUPLING AT MEDIUM VOLTAGE IN A POWER LINE CARRIER COMMUNICATIONS SYSTEM

This invention is concerned generally with communication over electricity supply networks (sometimes termed PLC, Power Line Communication), and more particularly over underground networks operating at voltages above the final supply voltage to consumers.

BACKGROUND OF THE INVENTION

Mains distribution—general

In most major countries, electricity is supplied on a wide scale by electricity generating and distribution companies (electricity utilities). The distribution network normally consists of a large number of low voltage networks (often termed the mains) to which domestic and small business consumers are connected, with the low voltage networks being supplied through a higher voltage distribution network or system (often termed the grid). The low voltage (consumer) networks may for example operate at 230 V (or 440 V 3-phase).

The distribution network will normally operate at more than one voltage. There is long-distance distribution at voltages of say 132 kV or 275 kV, which we will term high voltages. These high voltages are stepped down (possibly through 2 or more stages) through transformer and switching stations (which we will term primary or high voltage stations) to voltages of say 11 kV or 33 kV, which we will term intermediate voltages. These are in turn stepped down through further transformer and switching stations (which we will term substations) to the final consumer mains voltage.

Mains signalling—general

The use of the mains for signalling has often been proposed. Systems are available for intercommunication between rooms in domestic premises (typically for "baby alarms"), for coupling to the telephone system, and for transmission of data between computer units. Many proposals have also been made for the use of mains signalling for remote meter reading (primarily for electricity meters, though gas and other meters can be coupled to the mains for this purpose, preferably through electricity meters).

There is in fact an international standard now for such signalling, using frequencies in the general region of 3 to 150 kHz. The standard is CENELEC EN50065.1, which specifies that frequencies in the band 3 kHz–148.5 kHz are available for signalling on low voltage electrical installations. This bandwidth is divided into several smaller bands with various uses and permissions associated with them; for example, the 9 kHz–95 kHz band is reserved for electricity suppliers and their licencees.

The signalling will normally involve users, and will therefore operate over the low voltage portions of the network. However, as noted above, the distribution network will normally include intermediate and high voltage levels, coupled through power transformers. The transformers between the intermediate and the final low (consumer) voltage levels are normally located at unattended sites which have no ready means of communication over other communication networks such as telephone systems. It is therefore often desirable to couple PLC (power line carrier) signals between the low and intermediate voltage portions of the network and over intermediate voltage portions of the network.

Signalling frequency signals do not pass through power (distribution) transformers effectively. Some means of coupling PLC signals round such transformers is therefore necessary if signalling between low and intermediate voltage portions of the network is to be achieved. This will normally Involve signal reception and retransmission, with the signals being processed to remove noise. It may also be desirable to use different frequency bands on the two sides of the transformer. (This has the advantage that any signal feedthrough at power transformers will be irrelevant.)

Mains signalling—relevance of mains voltage level

Signal transmission and reception techniques are relatively straightforward for low voltage mains. The signal transmission and reception equipment can be connected directly to the mains wiring.

An intermediate voltage network, however, presents more difficulty, for both electrical and mechanical reasons. Intermediate voltage networks require physically robust insulation which is largely incompatible with direct connections to the intermediate voltage. Also, fairly delicate and sensitive electronic equipment is largely incompatible with direct connection to intermediate voltages (we are using the term "intermediate" voltage, of course, in connection with distribution networks; 11 kV, for example, is exceedingly high relative to most electronic equipment).

The standard technique is therefore inductive coupling, with a coupling device (transducer) comprising a magnetic core placed around the cable, forming a transformer. The core has a signal winding wound round it as a primary winding and the cable itself effectively forms a single-turn secondary winding (for transmission; for reception, the cable forms a single-turn primary and the signal winding forms a multi-turn secondary).

Overhead and underground networks

Distribution networks may be overhead, underground, or both. The high voltage portions are normally overhead, since they generally cross long distances of fairly open country, and the cost of burying them underground would be prohibitive. In many countries the low voltage portions are normally underground, since they are in densely populated areas where overhead wires would be unduly intrusive and potentially dangerous. The intermediate voltage portions may be overhead or underground; as with the low voltage portions, they are generally underground in urban and suburban areas. We are here concerned primarily with underground intermediate-voltage networks. (The term "underground" refers primarily to the cables; the transformer stations and substations are generally above ground.)

Underground Intermediate Voltage Networks
Network organization

An intermediate voltage network usually consists essentially of a primary switching and transformer station at which the high voltage supply is transformed down to the intermediate voltage, and a number of intermediate voltage chains radiating from the primary station. Each intermediate voltage chain consists of a series of substations at which the intermediate voltage in transformed down to mains voltage feeding a local mains network. A substation normally consists of a transformer together with switchgear which can isolate the transformer from either side of the chain.

In practice, such intermediate voltage chains are often paired, with their far ends joined so that they form a loop from the primary station, This allows the lengths of the two chains to be adjusted; thus if a fault occurs at a particular substation, that substation can be isolated and the loop effectively broken into two chains at that substation, so that all the other substations can still be fed. Each substation contains two circuit breakers, one for each of the two sides of the chain in which it is connected.

It is also not uncommon for there to be branches off the chains. This will often result from the addition of an extra secondary substation after the original chain has been installed. It will be often easier to simply connect a branch from some convenient point in the chain to the new substation (so forming a "tee") than to break the chain to insert the new substation in it; further, if the new substation is some distance from the chain, it will be cheaper to install a single connecting cable to it than to install two parallel cables to maintain the linear structure of the chain.

Cables

A substation at which power is transformed down from intermediate to low voltage uses underground cable connections for both the low and intermediate voltage sides (though we are here concerned only with the intermediate voltage side). Such cables are of stout construction, with a conductive protective sheath or armour such as aluminium (which may be corrugated for flexibility) or lead, or strands of of steel wires which may form a woven mesh. There may be an outer insulating layer, such as polyethylene, over the sheath, to provide mechanical and chemical (ie anti-corrosion) protection for the sheath.

The intermediate voltage supply may consist of either a single cable containing all the live conductors or separate cables for each of the live conductors. There will often be three live conductors, as distribution networks are normally 3-phase systems, at least at high and intermediate voltages; but there may be a single conductor, as only a single phase may be used at intermediate voltage, and earth and the sheath are often used as the neutral or return conductor. The inner conductor or conductors of the cable, are of course well insulated.

Signalling in Underground Intermediate Voltage Networks

General

The signalling circuitry at a substation will normally consist of a low voltage transducer on the low voltage side, an intermediate voltage transducer on the intermediate voltage side, and a signalling u nit coupling these transducers. (Obviously the terms "low voltage" and "intermediate voltage" identify the locations of the transducers, not the signal voltages at which they operate.)

There is normally a continuous conductive path through the substation for each of the intermediate voltage phases, so a single intermediate voltage transducer may be sufficient for signalling in both directions from the substation on the intermediate voltage chain. (This also means that signals may well pass through the substation, from one side of the intermediate voltage chain to the other.) If desired, however, two intermediate voltage transducers may be provided, one on each (intermediate voltage) side of the substation. If the substation is at the end of its chain, with one of its circuit breakers open to isolate it from the other chain, this will also enable it to send signals on that other chain if desired.

The signalling circuitry at each substation in the chain will therefore forward signals from its low (mains) voltage side towards the high voltage station, and will receive information from the high voltage station. It may also act as a relay between the high voltage station and further substations on the far side of the chain from the high voltage station.

It may be convenient to effectively divide the intermediate voltage network into sections, for signalling purposes, by using different frequency bands for the different sections.

Coupling to cables

To send signals along an intermediate voltage cable, signals are (as discussed above) be inductively coupled into it by the transducer, must pass along it from one substation to the next, and are inductively coupled from it by the transducers at the other substations and/or the high voltage station for detection.

Cable sheath shielding

In certain cases, particularly at indoor substations, the sheath is removed from the end of the cable so that the inner conductor (with its insulation) is accessible. (if the cable has several conductors in it, these are all equivalent for present purposes, and we will therefore use the singular term, "conductor", for all inner conductors.) This inner conductor is connected to a suitable terminal on the switchgear; protective insulating sleeving is usually placed over the conductor and terminal, and is typically heat-shrunk in place. A conductive strap is connected to the end of the cable sheath and attached to the switchgear housing to ensure the earthing of the sheath.

With this form of cable termination, an intermediate voltage transducer can be placed around the inner conductor without excessive difficulty.

In many cases, however, particularly at outdoor substations, the cable is attached firmly to the switchgear (or transformer) by a gland which seals it to the equipment housing, and this gland will normally attach the sheath firmly to the housing, both mechanically and electrically. The housing will be earthed (typically by being attached to large buried metal mats), so the cable sheath will therefore effectively be earthed at the ends of the cables. The cable sheath may also be earthed at many locations intermediate between the substations; even if as is usual, the cable has an insulating coating, that coating may well be broken at a number of places, either accidentally or deliberately.

With such a cable termination, the cable sheath electromagnetically shields the inner conductor of the cable. A signalling transducer necessarily has to have its magnetic core placed surrounding the entire cable, ie both the sheath and the inner conductor. It is clear that magnetic flux induced in the core by signals in the signal winding will induce signals primarily in the cable sheath, with the cable conductor being shielded by the cable sheath. The induced cable signals will therefore be primarily in the cable sheath.

The cable sheath will therefore prevent signals from being coupled onto the cable conductor; the signals will be induced in the sheath. As discussed above, however, that sheath may well be earthed at a variety of points along its length, or even along substantially its entire length. Any signals induced in it will therefore be liable to be rapidly dissipated. Thus the sheath signals cannot be used with any reliability for signalling.

To achieve effective signalling, therefore, signals must be induced in the cable conductor. This means that the shielding effect of the cable sheath must somehow be overcome. To achieve this, the cable sheath at the able termination must be insulated from the transformer housing.

With an existing gland, the only way that this can be achieved is by reconstructing the gland to incorporate an insulating collar. The cable sheath must be terminated inside the gland, and an earthing strap must be attached to this isolated end of the sheath and brought back along the cable and then returned to the transformer housing outside the gland to complete the connection of the sheath to the transformer housing.

The transducer can then be located around the cable near to the sealing gland to the transformer housing, with the earthing strap which runs back along the cable being passed through it. This effectively cancels the coupling of the cable sheath with the magnetic core of the transducer, since the sheath is in series with earthing strap which passes through the core in the opposite direction. A signal applied to the magnetic core will effectively induce equal voltages in the cable sheath and the earthing strap. These voltages are connected in series opposition and will cancel out, leaving no induced voltage in the sheath.

The magnetic core will thus be able to induce a signal in the cable conductor, and this signal will travel along the cable to other intermediate voltage network substations. Similar arrangements at other substations, and at the high voltage station, enable such signals in the cable conductor to be detected without being shielded off from the transducer by the cable sheath.

If a new substation is being installed, a new connection is being made, or a connection is being renewed for some other reason, this modification of the normal gland construction (ie the installation of a modified gland) can generally be made without undue trouble. But this clearly makes it extremely difficult, if not impracticable, for a transducer to be installed at an existing substation with normal gland cable terminations.

Brief Summary of the Invention
Principle of invention

The main feature of the present invention is the provision of an intermediate voltage signalling system in which signals are inductively coupled to and detected on a cable connected to a substation by means of a transducer including a magnetic core encircling the cable, the cable consisting of an inner conductor and an outer sheath, with the sheath being connected to the substation housing and thereby earthed.

Accordingly the present invention provides an electricity supply network comprising a plurality of switching and/or transformer stations connected together by cables, each cable comprising at least one inner conductor and an outer sheath which is connected to the housings of the stations, and a communication system comprising a plurality of transducers coupled to the cables at the stations, characterized in that the transducers are each located on the side of its cable remote from the sheath connection to the station housing, whereby the transducer is coupled to both the sheath and the conductor(s) of the cable.

Underlying discovery

The present invention rests upon our discovery that the shielding and earthing effects of the cable sheath are not as deleterious to the signal coupling as has hitherto been believed. As a result, we have found that it is possible to effectively transmit signals along the cable (primarily along the inner conductor) without having to isolate the sheath from the transformer housing.

If the sheath is not earthed (on the outgoing side of the cable, ie the side opposite the termination at the transformer) immediately adjacent to the transformer, a large signal relative to that induced in the inner conductor will be induced in the sheath, and will travel along the sheath. The sheath forms a highly irregular transmission line with the earth; the irregularities result from varying capacitances and the various conductive leakage paths, of varying resistances, to earth. This general irregularity, and the conductive leakage paths in particular, result in a large attenuation, so that the sheath signal received at the other end of the cable may well be negligible.

But the sheath also forms a transmission line, of relatively high quality, with the inner conductor, and we have found that a signal balancing between the sheath and the inner conductor occurs, so that along a substantial length of cable, a signal is transferred to the inner conductor of amplitude comparable with that in the sheath. Thus a signal is coupled onto the inner conductor, which forms a reasonably good quality transmission line extending along the entire length of the cable to the next substation. (One manner in which this coupling from the sheath to the inner conductor occurs is by the current in the sheath producing a longitudinal voltage in the sheath, which is capacitively coupled to the inner conductor to produce a longitudinal voltage, and hence a current, in the conductor.)

If the sheath is well earthed (at the signal frequencies) at an intermediate point along the cable (eg by an intermediate substation), the signal in the sheath will be reduced to a low value at that point. Beyond that point, signal coupling between the inner conductor and the sheath will work in reverse, effectively transferring part of the signal from the inner conductor to the sheath; and if the sheath is also earthed at some further point as well, this will result in a further loss of signal strength. But although signal equalization in such circumstances results in attenuation, the amount of such attenuation is not excessively high.

In addition, although the cable sheath does indeed shield the inner conductor, this shielding is not complete, so that a significant signal is induced in the inner conductor at the transmitter.

The inner conductor therefore picks up a sufficiently large signal, and has sufficiently low attenuation, for reasonably reliable signalling to be achievable in virtually all intermediate voltage networks.

If there are several inner conductors in the cable, they will of course share the signal between them. They will also be coupled together sufficiently closely for any imbalance between the signals on them to be largely eliminated over a relatively short length of the cable.

Advantage over prior art

One major advantage which the present invention has over the prior arts system described above that it can readily be installed on existing intermediate voltage networks. In the present invention, the transducer preferably comprises a split magnetic core which can be opened to allow it to be placed around a (sheathed) cable and then closed to form a low reluctance magnetic loop. This can therefore be easily attached around an existing cable in a substation at a readily accessible point outside the transformer or switchgear housing, without requiring any further disturbance of the intermediate voltage side of that substation. With the prior art technique described above, in contrast, the intermediate voltage cable would have to be disconnected from the transformer and reinstalled with the more complicated attachment arrangement described above.

Obviously the low voltage side of the substation will have to be disturbed to some extent, to couple the signalling unit to the low voltage cabling and to power that unit. But that only requires the connection of the signalling unit to the low voltage cabling, and that is relatively simple to achieve.

Mains currents

There are of course large mains currents (typically at 50 or 60 Hz) flowing in the network, and there may be a danger of the core of the transducer being saturated by the magnetic fields which these produce.

In a 3-phase system, the three phases should be roughly balanced, so the net current through the three phases together should be small. Further, the transformers will often be delta rather than star connected, so the net current through the three phases will then be zero even if the system is unbalanced. The transducer encircles a cable; so if there is a single cable containing 3 conductors for the 3 phases of a 3-phase supply, then the net mains current through the transducer will be small or zero.

If the network is single-phase, or has a single-phase portion (eg a spur), there will be a cable with only one phase conductor. This phase current must of course have a return path, which will normally consist of a neutral return. The primary path for this neutral return will often be the sheath of the cable. In this case also, the net mains current through a transducer encircling the cable will depend on how much of the neutral return current flow through the cable sheat (and hence through the transducer, opposing the effect of the phase current) and how much flows through other earth paths.

With the present system, the transducer is placed around the cable at a location including its sheath. Thus in the above situations, the transducer core is unlikely to be saturated by mains currents. However, there may be unbalanced mains currents flowing through the transducers in the present system under certain conditions. (These include some single-phase systems, and fault conditions on 3-phase systems.) It may therefore be desirable to include a small controlled air gap in the core, to minimize this danger. A convenient size for such a gap may be in the region of 200 $\mu$m.

In the prior art system, the sheath current is not coupled to the transducer, which therefore sees only the net current through the phase conductor or conductors. The danger of transducer core saturation is therefore greater. If the transducer is placed around a 3-phase cable, the net current is small or zero; but with a single-phase cable, or if the transducer is placed around a single unsheathed phase conductor in a substation, there will be large mains currents through the transducer.

It may therefore be desirable to employ the present system even at substations where the cable termination exposes accessible lengths of the inner conductors, to minimize the chance of saturation of the transducer core by such fault currents. If it is preferred to locate the transducers around such accessible portions of the inner conductors of the cables, they should be located near to the point where the conductors emerge from the cables, so that they pass around all 3 conductors (assuming a 3-phase system), to minimize the net mains currents; also, the earth straps should be passed through the transducers, for reasons, discussed below, relating to fault detection.

Implementation

General structure

A feature of the present invention is a 2-part split transducer, including a magnetic core, which can be placed around an intermediate voltage cable and closed up; the closing up is preferably by means of bolts or screws. The 2 parts may be entirely separate, or may be hinged together. One part preferably consists solely of a section of the magnetic core, which the other part includes the winding for connection to the signalling unit.

The mating faces of the two parts of the core may have complementary. shapes to ensure correct assembly. To minimize the effective air gap, the mating faces may have sloping portions which overlap and slide together.

Multiple windings

It has been assumed so far that the core has a single winding, which is used for both transmission and reception. It may be preferable to have separate windings for transmission and reception; this will allow the numbers of turns for transmission and reception to be different. If the reception winding has more turns than the transmission winding, this will give a step-up gain. However, transmission will tend to saturate the receiver circuitry coupled to the same magnetic core, and such a step-up gain would make this problem worse.

It may also be desirable to have a monitor winding on the magnetic core. (It may be desirable to have more than one such winding.) Such a monitor winding can be used for various purposes.

First, it can be used to monitor the inductance or reluctance (magnetic loop resistance) of the core, and thereby determine whether the core has been properly assembled. For proper operation, the two parts of the core must be assembled with a minimal air gap. If the core is assembled sloppily or with contamination such as dirt, or has been cracked by rough handling, or is subjected to strain or the entry of contamination after assembly, its reluctance may be high. The transmit and receive windings will then not be properly coupled to the cable. A high reluctance of the magnetic core will result in it having a much lower inductance than it should have, and the monitor winding can be used to detect this.

Second, although the gain (or Q factor) of the couplings of the transmit and receive windings to the particular cable will generally be low, it may nevertheless be desirable to "tune" these couplings. This can be done (preferably automatically) either by adjusting capacitances connected across the windings or by having tapped windings and adjusting which tap is used. The monitor winding can be used to monitor the parameters of the cable and thus allow the capacitance or tapping selection to be chosen appropriately (either at initial installation or on a periodic or continuous basis).

Third, the monitor winding can be used to monitor the net mains current flowing in the cable. The purpose of this is to monitor fault current on the intermediate voltage network, as discussed in the next section. This, can be done by measuring the inductance of the core. If the net mains current is large enough to take the core close to saturation, the inductance of the core will decrease; hence a large net mains current will modulate the core inductance at twice the mains frequency, and the amplitude of the modulation will be dependent on the size of the net mains current.

If the magnetic core has more than one winding, then all the windings are preferably on the same part of the core (ie the same part of the transducer). That part of the core preferably also has an identification circuit which comprises a permanently wired ID number (eg in the form of a code chip), so that the signalling unit knows when a transducer is attached to one of its ports, and can also check the nature of that transducer.

INTERMEDIATE VOLTAGE NETWORK MONITORING

General

In an intermediate voltage distribution network, faults will occasionally occur, the major type of fault being a short circuit at some point. This will result in a fault current which is typically 2 or more orders of magnitude larger than the normal load currents, eg 5 kA compared to 50 A., The primary (high voltage) station normally contains circuit breakers which open on such faults. (The circuit breakers may re-close automatically, but will obviously re-open immediately if the fault is not transient.)

It is obviously desirable to locate the fault as efficiently as possible. At present, the usual way of doing this is for engineers to visit each substation in turn to check it, opening and closing the circuit breakers at the various substations to determine how far the chain of substations can be reconnected to the high voltage station without the fault current recurring. Hopefully, this will result in the location of the fault being identified as being at a single substation or between a pair of adjacent substations.

Fault detection

In the present system, the monitor winding on the transducer can be used to monitor the size of the net mains current flowing through the transducer. This can be signalled to a convenient location in the network, typically the primary station, either at regular intervals, or on sudden changes, or when, a preset threshold level is exceeded. This information can be useful in helping to locate a fault.

There are various kinds of fault, but the main types involve a short circuit from a phase conductor to earth, typically as a result of a cable being damaged or as a result of a fault in a substation. The fault current will flow through earth back to the the primary station.

As described above, an intermediate voltage network typically consists of two chains of substations linked at their far ends (ie the ends remote from the the primary station). However, the cable sheaths (and the connections between the cable sheaths at the substations) form a continuous loop with both ends at the primary station. In addition, there are general earth paths through the ground from the cable sheaths. The return earth current resulting from a fault will therefore divide between these three paths, in proportions depending on their various resistances.

For a typical transducer in the present system around a 3-phase cable, the net mains current passing through it is small or zero under normal conditions. On a fault, an additional fault current will flow in one or more of the phase conductors. This fault current will return as an earth return current divided between the sheath of the cable through which the phase fault current flows, the sheath of the cable on the far side of the fault, and the general ground path. The sheath fault current through the transducer will therefore be less than the phase fault current through it, so there will normally be a substantial net mains current through the transducer.

By monitoring the inductance of the transducer as described above, the occurrence of a net mains current large enough to take the transducer core close to saturation can therefore be detected, and the magnitude of the current can be measured. Such a net mains current will normally indicate the occurrence of a fault. The various substations detecting a fault in this way will signal the fault condition and the current levels to the primary station. The various signals can then be analyzed to assist in locating the fault.

Although monitoring the inductance of the transducer core will generally yield only a fairly crude indication of the size of the net mains current, that will generally be sufficient to locate the fault. If two faults should occur simultaneously, eg as a result of lightning, and one fault current does not swamp the other, the primary station will then be able to determine that two faults have occurred, and to locate them, by analysing the total fault current magnitudes at the various substations.

Obviously, the sense as well as the magnitude of the net mains current through a transducer can be determined by suitable techniques. Such additional information will generally be useful in locating the fault more precisely.

If a signalling unit detects an excess current, it will normally transmit a signal immediately. Since the signalling is preferably performed at frequencies in the region of 100 kHz, compared with the mains frequency of 50 or 60 Hz, the signalling units should have ample time to transmit or forward messages about fault currents before they lose power.

A very large fault current may saturate the transducer core to such an extent that it becomes impossible for it to transmit a signal. The danger of this is reduced if the core includes a small air gap, as discussed above. As a further measure, however, the signalling unit may include sufficient power storage (eg rechargeable batteries) for it to be able to continue with signal transmission for a short period after loss of the intermediate voltage. (Obviously the normal signalling, concerned with such matters as taking meter readings from users on the low voltage network, would be suspended immediately on faults of this type.) The loss of the intermediate voltage will not affect the propagation of the high frequency signals.

BRIEF DESCRIPTION OF THE DRAWINGS

An intermediate voltage distribution network embodying various aspects. of the invention will now be described, by way of example, with reference to the drawings, in which:

FIGS. 5, 6A, 6B, and 7 show various possible forms of construction of the magnetic core of the transducer.

DETAILED DESCRIPTION OF THE INVENTION

Figure 1:
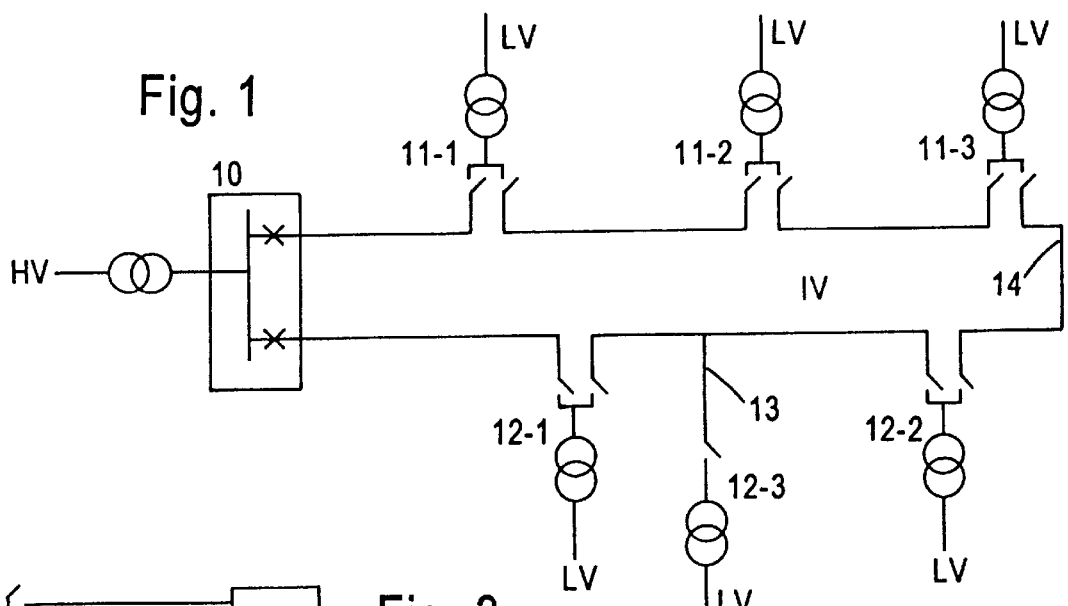
FIG. 1 is a diagram of an intermediate voltage distribution network.

FIG. 1—Intermediate voltage network

FIG. 1 shows diagrammatically an intermediate voltage distribution network. A high voltage station 10 transforms high voltage down to intermediate voltage. Two chains of substations (substations 11-1 to 11-3, and substations 12-1 and 12-2) transform the intermediate voltage down to low voltage, with a further substation 12-3 being connected by means of a branch 13 off the second chain. The two chains of substations are connected together at the ends remote from the high voltage station 10 by a link 14. Each of the substations in the two main chains is connected by a pair of circuit breakers, one on each side of the substation; substation 12-3 is connected to its chain by a single circuit breaker.

Figure 2:
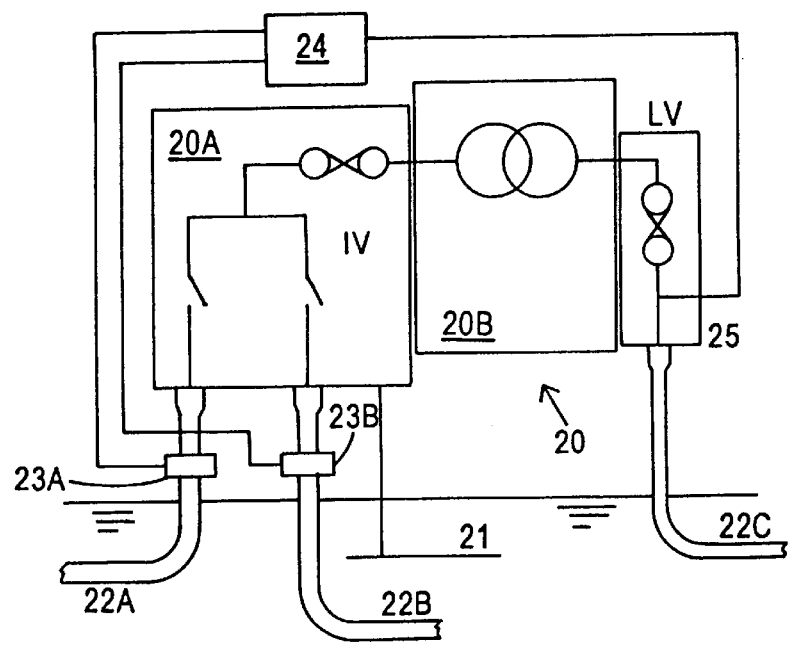
FIG. 2 is a diagram of a substation of the FIG. 1 network.

FIG. 2—substation in FIG. 1 network

FIG. 2 shows diagrammatically a typical substation 11. This has a housing 20, comprising a switchgear portion 20A and a transformer housing 20B, with a buried earthing grid 21 attached to it. Two intermediate voltage buried cables 22A and 22B are brought up out of the ground to the switchgear portion 20A, and a buried low voltage cable 22C is also brought up out of the ground to a low voltage connection box 25 attached to the transformer portion 20B, as shown. Each of the intermediate voltage cables 22A and 22B has a sheath which protects the cable and acts as an earth/neutral return conductor, and is connected (mechanically and electrically) to the switchgear portion housing 20A.

The substation also has a signalling system comprising a pair of transducers 23A and 23B connected to a signalling unit 24. The transducers 23A and 23B are attached around the intermediate voltage cables 22A and 22B respectively, at positions between the switchgear housing and ground level, and the signalling unit 24 is also connected to the low voltage connection box 25. The signalling unit is powered from the low voltage connection box 25 and is also coupled to the low voltage cable 22C (via the connection box 25) to transmit and receive signals over the low voltage cable. The signalling unit also transmits and receives signals over the intermediate voltage cables 22A and 22B, being coupled thereto by the transducers 23A and 23B.

For present purposes, the preferred signalling frequency band for the signals sent over the intermediate voltage network is in the upper region of the CENELEC band, ie from say 50 kHz to 150 kHz, or the adjacent band above that, extending to say 300 kHz.

It will of course be understood that each of the substations 11-1 to 12-3 shown in FIG. 1 will have a signalling system, and the high voltage station 10 will also have a signalling system, the various signalling systems together forming a communication system. (The details of the high voltage signalling system may of course be different to those of the substation signalling systems.)

Figure 3:
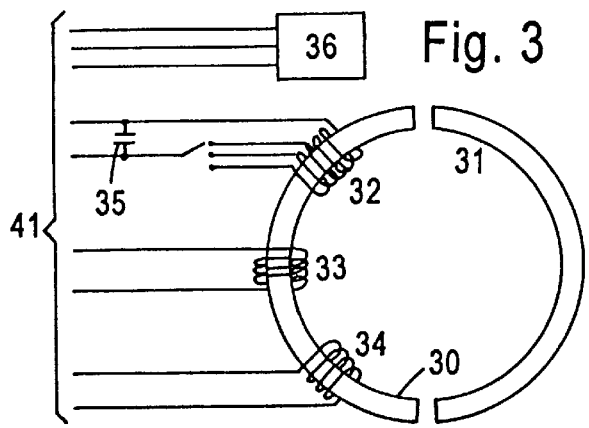
FIG. 3 is a more detailed diagram of a transducer.
Figure 4:
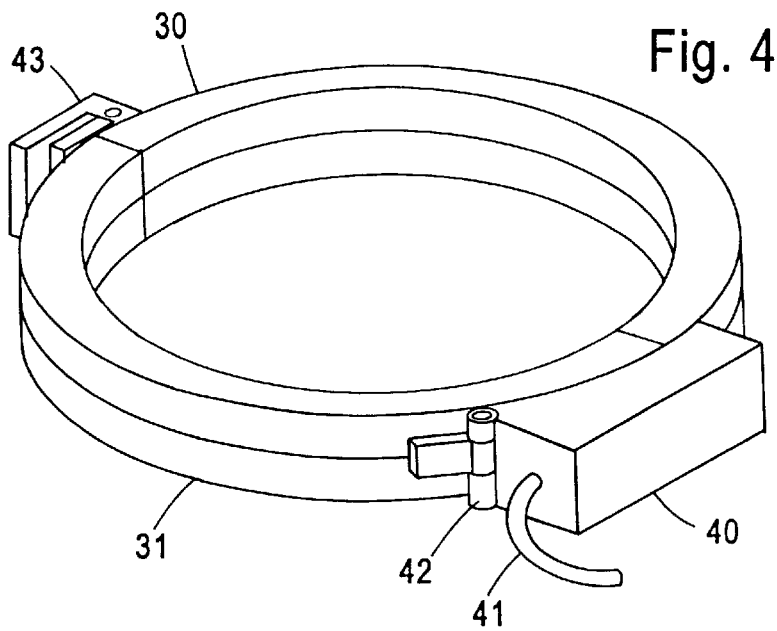
FIG. 4 is a perspective view of a transducer.

FIGS. 3 and 4—transducer

FIG. 3 shows diagrammatically a transducer 23. A magnetic core is formed by two sections 30 and 31, with section 30 having a drive winding 32, a sense winding 33, and a monitor winding 34. The drive winding 32 has a capacitor 35 connected across it to tune it, and has several taps, so that its tuning can be adjusted. (Other ways of tuning, such as providing steppings on the capacitor 35, can of course be used.) The sense winding may be similarly tunable. Section 30 also has an identification element 36, which has a coded ID which can be read by the signalling unit 24. The material of magnetic core is chosen to have suitable transmission characteristics in the signalling frequency band and over the expected temperature range, and not to be significantly affected by the 50 Hz mains frequency power passing through the cable; a ferrite material will generally be suitable, but thin metal laminations may of course be used if desired.

FIG. 4 is a perspective view of the transducer. Portion 30 is attached to a circuit box 40, which contains the circuitry shown in FIG. 3 and has a cable 41 for connection to the signalling unit 24. The circuit box 40 is hinged at 42 to portion 31, so that the two portions 30 and 31 can be hinged apart to be placed around an intermediate voltage cable and then hinged together. Fastening means 43, which may for example be clip means, are provided to hold the two portions 30 and 31 together.

FIGS. 5 to 7—transducer core

Various techniques can be used to achieve good magnetic contact between the mating faces of the two portions of the magnetic core. As shown in FIG. 5, the core may be formed of a plurality of concentric elements, some of which (51, 52) have flat mating faces while others (53) have slanted faces, to ensure correct alignment. As shown in FIGS. 6A and 6B, the mating surfaces may have sliding contact, which both helps to wipe off any contamination during assembly and gives a wider cross-sectional area to the air gap and thus a lower reluctance. A laminated construction can also be used, with the magnetic core made up of a plurality of layers, as shown in FIG. 7.

Figure 8:
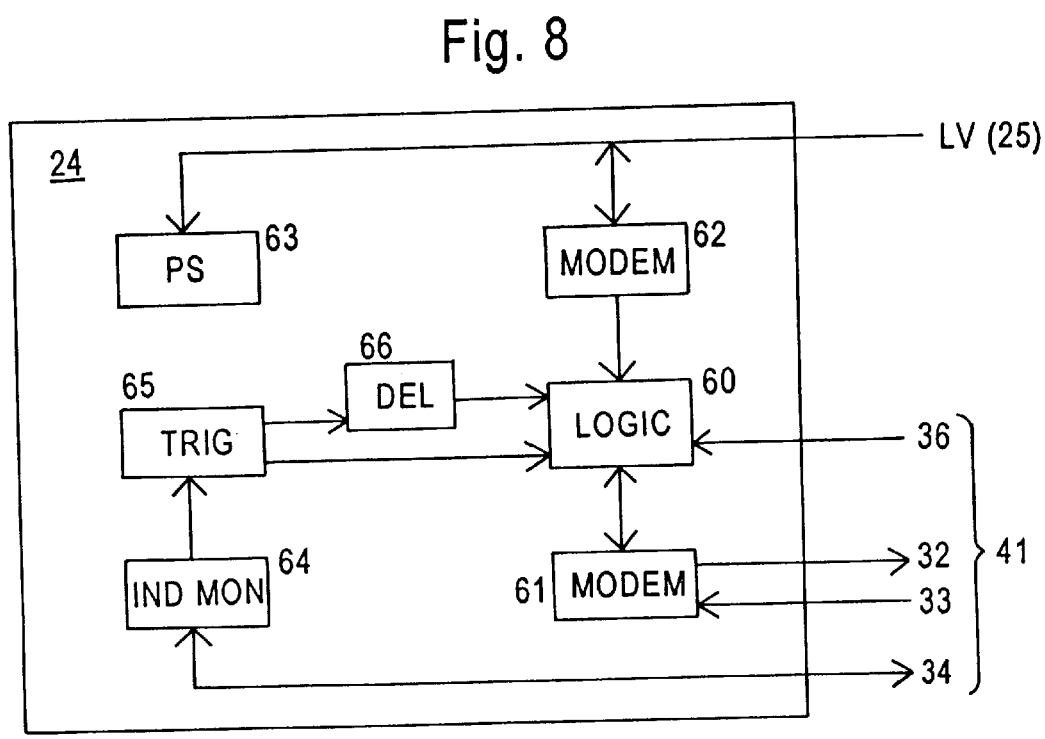
FIG. 8 is a simplified block diagram of a signalling unit.

FIG. 8—signalling unit

FIG. 8 is a simplified block diagram of a signalling unit 24. A logic unit 60 is directly coupled to the identification element 36, and to a modem 61 which is coupled to the drive winding 32 and the sense winding 33. This modem converts the logic signals from the logic unit 60 to suitably modulated signals in the signalling frequency band and vice verse The logic unit 60 is also coupled to a modem 62 which is coupled to the low voltage cable in the low voltage connection box 25. The logic unit 60 may also provide and accept information relating to the substation itself. The signalling unit can thus transmit, receive, and forward information.

The signalling unit also includes a power supply unit 63 which is energized from the low voltage conductor. This power supply unit includes suitable storage means, eg a capacitor or rechargeable battery (not shown), so that the signalling unit can remain operational for a short period if the substation should lose power.

The signalling unit also included an inductance monitor unit 64, which is coupled to the monitor winding 34 of the transducer and operates to monitor the inductance of the transducer. This monitor unit 64 feeds a trigger or level determining unit 65, which converts the inductance into digital form and also detects when the inductance falls below a level representing near total saturation. The level determining unit 65 feeds the, digital inductance value to the logic unit 60. It also feeds the saturation-indicating signal to a delay unit 66, which in turn feeds the logic unit 60.

When a mains fault current occurs on the intermediate voltage cable and reduces the inductance of the transducer core, the logic unit 60 detects the change in inductance signalled from unit 65, and interrupts its normal operation to send a message which indicates the occurrence of the fault and the magnitude of the fault current. (The fault current is the net mains current, and its magnitude is calculable from the change in inductance of the transducer core, as discussed above.)

If the fault current is too large, the transducer core will be too close to saturation for message transmission to be possible. In this event, the delay unit 66 will be triggered. The logic unit will respond to the delayed output from this unit by sending the fault message after a delay which is sufficient for the intermediate voltage network to have been de-energized (by the opening of circuit breakers at the primary station) and the core to have become desaturated. As noted above, message transmission is not affected by de-energization of the intermediate voltage network.

We claim:

1. An electricity supply network comprising a plurality of switching and transformer stations connected together by cables, each cable comprising at least one inner conductor and an outer sheath, which is connected to housings of the stations, and a communication system comprising a plurality of transducers, each transducer is coupled to its respective cable at each station, each of the transducers being located on a side of its respective cable remote from a sheath connection of the respective cable to its station housing, whereby each transducer is coupled to both the sheath and the at least one conductor of its respective cable.

2. A network according to claim 1, wherein at least one cable termination includes a gland connecting each cable sheath to its respective station housing.

3. A network according to claim 1, wherein at least one cable termination includes an accessible length of at least one inner conductor and an earth strap connecting a respective sheath to a respective station housing, each transducer being located around its respective cable at a point where its sheath is present.

4. A network according to claim 1 wherein at least one cable termination includes an accessible length of at least one inner conductor and an earth strap connecting a respective sheath to a respective station housing, each transducer being located around the accessible length of at least one inner conductor and the earth strap passing through the respective transducer.

5. A network according to claim 1 wherein each transducer comprises two separable magnetic core sections.

6. A network according to claim 5 wherein the two magnetic core sections have mating faces.

7. The network of claim 6 wherein the mating faces are constructed and arranged to mate with a keying action.

8. The network of claim 6 wherein the mating faces slope and are constructed to mate with a sliding action.

9. A network according to claim 5, wherein each of the transducers has separate drive and sense windings.

10. A network according to claim 5, wherein the transducer includes drive and sense windings, at least one of the drive and sense windings forming part of a tuned circuit.

11. A network according to claim 10, wherein the tuned circuit is adjustable.

12. A network according to claim 5, wherein each of the transducers has a monitor winding separate from all other windings of the transducer.

* * * * *